(12) United States Patent
Blodgett

(10) Patent No.: US 6,981,126 B1
(45) Date of Patent: *Dec. 27, 2005

(54) CONTINUOUS INTERLEAVE BURST ACCESS

(75) Inventor: Greg A. Blodgett, Nampa, ID (US)

(73) Assignee: Micron Technology, Inc., Boise, ID (US)

( * ) Notice: Subject to any disclaimer, the term of this patent is extended or adjusted under 35 U.S.C. 154(b) by 242 days.

This patent is subject to a terminal disclaimer.

(21) Appl. No.: 10/615,003

(22) Filed: Jul. 8, 2003

Related U.S. Application Data

(63) Continuation of application No. 10/118,299, filed on Apr. 8, 2002, now Pat. No. 6,601,156, which is a continuation of application No. 08/675,139, filed on Jul. 3, 1996, now Pat. No. 6,401,186.

(51) Int. Cl.⁷ ............................................. G06F 12/16
(52) U.S. Cl. ...................................... 711/213; 711/218
(58) Field of Search ......................... 365/233; 711/105, 711/137, 168, 169, 204, 213, 217, 218

(56) References Cited

U.S. PATENT DOCUMENTS

| | | | |
|---|---|---|---|
| 4,195,770 A | 4/1980 | Benton et al. ............. 371/21.2 |
| 4,344,156 A | 8/1982 | Eaton et al. ................ 365/203 |
| 4,355,377 A | 10/1982 | Sud et al. ................... 365/203 |
| 4,484,308 A | 11/1984 | Lewandowski et al. ..... 364/900 |
| 4,510,603 A | 4/1985 | Catiller ........................ 371/21 |
| 4,513,389 A | 4/1985 | Devchoudhury ........... 364/900 |
| 4,519,028 A | 5/1985 | Olsen et al. ................ 364/200 |
| 4,562,555 A | 12/1985 | Ouchi et al. ................ 365/233 |
| 4,567,579 A | 1/1986 | Patel et al. ................. 365/189 |
| 4,575,825 A | 3/1986 | Ozaki et al. ................ 365/189 |
| 4,594,587 A | 6/1986 | Chandler et al. ........... 340/750 |
| 4,603,403 A | 7/1986 | Toda ........................... 365/189 |
| 4,618,947 A | 10/1986 | Tran et al. ................... 365/230 |
| 4,636,986 A | 1/1987 | Pinkham ..................... 365/195 |
| 4,649,522 A | 3/1987 | Kirsch ......................... 365/189 |
| 4,685,089 A | 8/1987 | Patel et al. ................. 365/233 |
| 4,707,811 A | 11/1987 | Takemae et al. ............ 365/239 |
| 4,750,839 A | 6/1988 | Wang et al. ................ 365/233 |
| 4,758,995 A | 7/1988 | Sato ........................... 365/230 |
| 4,766,431 A | 8/1988 | Kobayashi et al. ......... 340/799 |
| 4,788,667 A | 11/1988 | Nakano et al. ............. 365/193 |
| 4,799,199 A | 1/1989 | Scales et al. ............... 365/230 |
| 4,847,758 A | 7/1989 | Olson et al. ................ 364/200 |
| 4,851,990 A | 7/1989 | Johnson et al. ............. 364/200 |
| 4,857,899 A | 8/1989 | Ishii ........................... 340/701 |
| 4,870,622 A | 9/1989 | Aria et al. ............. 365/230.02 |
| 4,875,192 A | 10/1989 | Matsumoto ................. 365/193 |

(Continued)

FOREIGN PATENT DOCUMENTS

DE 19507562 9/1995 ............ G11C 7/00

(Continued)

OTHER PUBLICATIONS

*In: 1996 DRAM Data Book*, Micron Technology, Inc., Boise, ID,(1996),p. 5-75, 7-62.

(Continued)

*Primary Examiner*—Gary Portka
(74) *Attorney, Agent, or Firm*—Schwegman, Lundberg, Woessner & Kluth, P.A.

(57) ABSTRACT

A system is described which uses a burst access memory and a memory controller to anticipate the memory address to be used in future data read operations as requested by a microprocessor. Either the memory controller or the memory device initiates a burst read operation starting at a memory address generated thereby. The microprocessor can, therefore, wait to initiate a data read without suffering a time delay.

38 Claims, 7 Drawing Sheets

U.S. PATENT DOCUMENTS

| | | | |
|---|---|---|---|
| 4,899,312 A | 2/1990 | Sato | 365/230.09 |
| 4,926,314 A | 5/1990 | Dhuey | 364/200 |
| 4,933,910 A | 6/1990 | Olson et al. | 365/238.5 |
| 4,984,217 A | 1/1991 | Sato | 365/230 |
| 4,985,641 A | 1/1991 | Nagayama et al. | 307/272.3 |
| 4,993,027 A | 2/1991 | McGraw et al. | 371/16.2 |
| 5,058,066 A | 10/1991 | Yu | 365/189.05 |
| 5,083,296 A | 1/1992 | Hara et al. | 365/230 |
| 5,126,975 A | 6/1992 | Handy et al. | 365/230.01 |
| 5,146,582 A | 9/1992 | Begun | 395/500 |
| 5,175,835 A | 12/1992 | Beighe et al. | 395/425 |
| 5,210,723 A | 5/1993 | Bates et al. | 365/238.5 |
| 5,237,689 A | 8/1993 | Behnke | 395/700 |
| 5,243,699 A | 9/1993 | Nickolls et al. | 395/275 |
| 5,253,357 A | 10/1993 | Allen et al. | 395/425 |
| 5,261,064 A | 11/1993 | Wyland | 395/400 |
| 5,267,200 A | 11/1993 | Tobita | 365/189.05 |
| 5,268,865 A | 12/1993 | Takasugi | 365/189.05 |
| 5,278,801 A | 1/1994 | Dresser et al. | 365/230.02 |
| 5,280,594 A | 1/1994 | Young et al. | 395/425 |
| 5,301,278 A | 4/1994 | Bowater et al. | 395/275 |
| 5,305,284 A | 4/1994 | Iwase | 365/238.5 |
| 5,307,320 A | 4/1994 | Farrer et al. | 365/230.01 |
| 5,309,398 A | 5/1994 | Nagase et al. | 365/189.05 |
| 5,311,471 A | 5/1994 | Matsumoto et al. | 365/189.05 |
| 5,319,759 A | 6/1994 | Chan | 395/400 |
| 5,323,352 A | 6/1994 | Miyata et al. | 365/222 |
| 5,325,330 A | 6/1994 | Morgan | 365/189.05 |
| 5,325,502 A | 6/1994 | McLaury | 395/425 |
| 5,325,513 A | 6/1994 | Tanaka et al. | 395/500 |
| 5,327,390 A | 7/1994 | Takasugi | 365/230 |
| 5,331,593 A | 7/1994 | Merritt et al. | 365/189.11 |
| 5,333,305 A | 7/1994 | Neufeld | 395/575 |
| 5,335,336 A | 8/1994 | Kametani | 395/425 |
| 5,339,276 A | 8/1994 | Takasugi | 365/230 |
| 5,349,566 A | 9/1994 | Merritt et al. | 365/233.5 |
| 5,357,469 A | 10/1994 | Sommer et al. | 365/193 |
| 5,363,330 A | 11/1994 | Kobayashi et al. | 365/185 |
| 5,369,622 A | 11/1994 | McLaury | 365/233 |
| 5,373,227 A | 12/1994 | Keeth | 323/313 |
| 5,379,261 A | 1/1995 | Jones, Jr. | 365/230.01 |
| 5,386,385 A | 1/1995 | Stephens, Jr. | 365/189.05 |
| 5,392,239 A | 2/1995 | Margulis et al. | 365/189.01 |
| 5,394,535 A | 2/1995 | Ohuchi | 395/425 |
| 5,400,292 A | 3/1995 | Fukiage et al. | 365/230.01 |
| 5,410,670 A | 4/1995 | Hansen et al. | 395/425 |
| 5,426,606 A | 6/1995 | Takai | 365/189.05 |
| 5,436,869 A | 7/1995 | Yoshida | 365/230 |
| 5,449,941 A | 9/1995 | Yamazaki et al. | 257/411 |
| 5,452,259 A | 9/1995 | McLaury | 365/221 |
| 5,452,261 A | 9/1995 | Chung et al. | 365/233 |
| 5,454,107 A | 9/1995 | Lehman et al. | 395/480 |
| 5,457,659 A | 10/1995 | Schaefer | 365/222 |
| 5,483,498 A | 1/1996 | Hotta | 365/233.5 |
| 5,485,428 A | 1/1996 | Lin | 365/221 |
| 5,487,043 A | 1/1996 | Furutani et al. | 365/203 |
| 5,487,049 A | 1/1996 | Hang | 365/221 |
| 5,499,355 A | 3/1996 | Krishnamohan et al. | 395/464 |
| 5,513,148 A | 4/1996 | Zagar | 365/233 |
| 5,522,064 A | 5/1996 | Aldereguia et al. | 395/550 |
| 5,526,320 A | 6/1996 | Zagar et al. | 365/233.5 |
| 5,561,814 A | 10/1996 | Glew et al. | 395/833 |
| 5,568,445 A | 10/1996 | Park et al. | 365/233 |
| 5,568,651 A | 10/1996 | Medina et al. | 395/894 |
| 5,587,950 A | 12/1996 | Sawada et al. | 365/201 |
| 5,587,964 A | 12/1996 | Rosich et al. | 365/238.5 |
| 5,592,435 A | 1/1997 | Mills et al. | 365/233.5 |
| 5,594,704 A | 1/1997 | Konishi et al. | 365/233 |
| 5,598,376 A | 1/1997 | Merritt et al. | 365/230.06 |
| 5,604,880 A | 2/1997 | Dipert | 395/430 |
| 5,610,864 A | 3/1997 | Manning | 365/193 |
| 5,630,163 A | 5/1997 | Fung et al. | 395/800 |
| 5,640,364 A | 6/1997 | Merritt et al. | 365/233.5 |
| 5,640,507 A | 6/1997 | Lipe | 395/183.01 |
| 5,651,130 A | 7/1997 | Hinkle et al. | 395/432 |
| 5,652,724 A | 7/1997 | Manning | 365/189.05 |
| 5,654,932 A | 8/1997 | Rao | 365/230.03 |
| 5,661,695 A | 8/1997 | Zagar et al. | 365/233.5 |
| 5,666,321 A | 9/1997 | Schaefer | 365/233.5 |
| 5,668,773 A | 9/1997 | Zagar et al. | 365/233 |
| 5,675,549 A | 10/1997 | Ong et al. | 365/233.5 |
| 5,682,354 A | 10/1997 | Manning | 365/233.5 |
| 5,696,732 A | 12/1997 | Zagar et al. | 365/233.5 |
| 5,706,247 A | 1/1998 | Merritt et al. | 365/233.5 |
| 5,713,011 A | 1/1998 | Satoh et al. | 395/556 |
| 5,717,654 A | 2/1998 | Manning | 365/233.5 |
| 5,721,859 A | 2/1998 | Manning | 397/421.07 |
| 5,721,860 A | 2/1998 | Stolt et al. | 395/432 |
| 5,729,503 A | 3/1998 | Manning | 365/233.5 |
| 5,729,504 A | 3/1998 | Cowles | 365/236 |
| 5,729,709 A | 3/1998 | Harness | 395/405 |
| 5,745,432 A | 4/1998 | McClure | 365/230.06 |
| 5,748,560 A | 5/1998 | Sawada | 365/233 |
| 5,751,656 A | 5/1998 | Schaefer | 365/233.5 |
| 5,752,269 A | 5/1998 | Divivier et al. | 711/169 |
| 5,754,838 A | 5/1998 | Shibata et al. | 395/559 |
| 5,757,703 A | 5/1998 | Merritt et al. | 365/189.05 |
| 5,784,331 A | 7/1998 | Lysinger | 365/230.06 |
| 5,802,010 A | 9/1998 | Zagar et al. | 365/233.5 |
| 5,812,490 A | 9/1998 | Tsukude | 365/233 |
| 5,825,691 A | 10/1998 | McClure | 365/189.01 |
| 5,825,715 A | 10/1998 | Rezeanu | 365/233.5 |
| 5,831,924 A | 11/1998 | Nitta et al. | 365/230.03 |
| 5,838,990 A | 11/1998 | Park et al. | 395/834 |
| 5,844,849 A | 12/1998 | Furutani | 365/194 |
| 5,848,018 A | 12/1998 | McClure | 365/201 |
| 5,854,911 A | 12/1998 | Watkins | 395/383 |
| 5,893,136 A | 4/1999 | Stolt et al. | 711/105 |
| 5,903,514 A | 5/1999 | Sawada | 365/233 |
| 5,946,265 A | 8/1999 | Cowles | 365/233 |
| 5,953,278 A | 9/1999 | McAdams et al. | 365/219 |
| 5,963,504 A | 10/1999 | Manning | 365/233.5 |
| 5,966,724 A | 10/1999 | Ryan | 711/105 |
| 6,006,339 A | 12/1999 | McClure | 713/500 |
| 6,061,296 A | 5/2000 | Ternullo, Jr. et al. | 365/233 |
| 6,069,839 A | 5/2000 | Pancholy et al. | 365/233 |
| 6,130,843 A | 10/2000 | Lee | 365/189.05 |
| 6,172,935 B1 | 1/2001 | Wright et al. | 365/233 |

FOREIGN PATENT DOCUMENTS

| | | | |
|---|---|---|---|
| EP | 0468480 | 1/1992 | G11C 7/00 |
| EP | 0547890 | 6/1993 | G11C 7/00 |
| JP | 61-170994 | 8/1986 | G11C 11/34 |
| JP | 5-89663 | 4/1993 | G11C 11/401 |
| JP | 5-282859 | 10/1993 | G11C 11/401 |
| JP | 06060658 | 3/1994 | G11C 11/409 |
| JP | 6-325599 | 11/1994 | G11C 29/00 |
| JP | 6-333393 | 12/1994 | G11C 11/409 |
| WO | WO-96/20482 | 7/1996 | G11C 7/00 |

OTHER PUBLICATIONS

*1996 DRAM Data Book*, Micron Technology, Inc.,(1996), pp. 1-1 to 1-52.

"'Rossini, Pentium, PCI-ISA, Chip Set'", *Symphony Laboratories.*, (1995),pp. 1-123.

"16MS DRAM Schematics", *Micron Technology*, (Feb. 1993),pp. 1-58.

"1995 DRAM Data Book", Micron Technology, Inc.,(1995), 1-42.

"1996 DRAM Data Book", Micron Technology, Inc., 1-1 to 1-52.

"2M×8 Synchronous DRAM Schematics, Rev. 1.9", *Micron Technology*, (Dec. 1995),pp. 357495-357595.
"2M×8 Synchronous Dram Schematicsm, Rev. 1.5", *Micron Technology*, (May 1994),pp. 1-85.
"4M DRAM", Toshiba American Electronic Components, Inc.,(1991),pp. A-137-A-159.
"Application Specific DRAM", *Toshiba America Electronic Components, Inc.*, (1994),C178, C-260, C 218.
"Burst DRAM Function & Pinout", Oki Electric Ind. Co., Ltd., 2nd Presentation, Item #619, (Sep. 1994).
"Burst EDO DRAM Information", Micron Technology, Inc., (Sep. 1995),1-126.
"Burst Edo Memory Device Address Counter", *PCT Application PCT/US95/16656*, (Dec. 21, 1995).
"Command Truth Table", NEC,(1993),1 page.
"DRAM 1 Meg×4 DRAM 5VEDO Page Mode", *1995 DRAM Data Book*, Micron Technology, Inc.,(1995),1-1 thru 1-30.
"Hyper Page Mode Dram", *Electronic Engineering, 66*, Woolwich, London, GB,(Sep. 1994),pp. 47-48.
"Integrated Circuit Technical Data-262, 144 Words×8 Bits Multiport DRAM", Toshiba Corp., TC52826TS/Z/FT/TR, TEN. Rev.2.1,(1980),pp. 1-63.
"KM48SV2000 Preliminary CMOS SDRAM", Samsung Electronics,(Mar. 1993),pp. 7-8.
"Micron Semiconductor, Inc.", *1994 DRAM Data Book, entire book*.
"Mitsubishi Samples 16M Synch DRAM",*Electronic News*, (1993),pp. 3-4.
"Performance: Fast DRAMS can be swapped for SRAM Caches", *Electronic Design*, vol. 41, No. 15, Cleveland, Ohio,(Jul. 22, 1993),55-67.
"Reduce DRAM Cycle Times with Extended Data-Out", *1994 DRAM Data Book*, Technical Note, Micron Semiconductor, Inc.,(1994),pp. 5-33-5-40.
"S3 Burst Mode DRAM", *S3 Incorporated*, Santa Clara, CA,(Jun. 1993),2 pages.
"Samsung Synchronous DRAM", *Samsung Electronics, Revision 1*, (Mar. 1993),pp. 1-16.
"Synchronous DRAM 2 MEG×8 SDRAM", *Micron Semiconductors, Inc.*, (1994),1-18.
"Synchronous DRAM 4 Meg×SDRAM", Micron Semiconductor, Inc.,(1983),pp. 1-42.
Bursky, Dave , "Novel I/O Options and Innovative Architectures Let DRAMs Achieve SRAM Performance; Fast DRAMS can be swapped for SRAM Caches", *Electronic Design, 41*, (Jul. 1993),pp. 55, 56, 60,62,64.
Crothers, B. , "Pentium processors contribute to EDO memory's popularity", *InfoWorld, 17(7)*, (Obtained from Computer Select—Dec. 1995,(Feb. 1995),p. 37.
Gowni, Shiva P., et al., "A 9NS, 32K×9, BICMOS TTL Synchronous Cache RAM With Burst Mode Access",*IEEE Custom Integrated Circuits Conf.*, (1992),pp. 781-784.
Jenisch, Ewald , *Googie Search of "edo mix"*, From: "Ewald.Jenisch@univie.ac.at", Subject: "Re: P55TP4 (Triton-based)—SYNC/BURST SRAMs?", Web Newsgroup, alt.comp.periphs.mainboard.asus, posted on Mar. 22, 1995, obtained via www.google.com,(1995),2 p.
Kovsky, S., "Intel's Triton chip set moves to notebooks",*PC Week, 12(16)*, (Obtained from Computer Select—Dec. 1995),(Apr. 1995),p. 47.
McAlexander, J. C., *Third Supplemental Expert Report*, In the U.S. District Court for the District of Delaware; Mosel Vitelic Coporation, Plaintiff, v. Micron Technology, Inc., Defendant; Micron Technology Inc., Counter-Plaintiff, v. Mosel Vitelic Corporation and Counter-Defendants; No. 98-449-GMS,(1998),pp. 1-28.
Oki, "Burst DRAM Function and Pinout, 128K×16/256K×16", *Oki Electric Ind. Co., Ltd., 2nd presentation, Item #619*, (1994),1-4.
Sunaga, Toshio , et al., "An Eight-bit Prefetch Circuit for High-Bandwidth DRAMs", *IEEE J. of Solid Satae Circuits, 32, 1*, (1996),pp. 105-110.
Tatosian, Dave , *Google Search of "edo triton fpm"*, From: "tatosian@plough.enet.dec.com", Subject: "Re: Detecting EDO ROM with Triton Mainboards", Web Newsgroup, comp.sys.intel, posted on Jul. 1, 1995, obtained via www.google.com,(1995),2 p.
Vanhoutven, Robert , *Google Search of "edo detect"*, From: "robert.vanhoutven@ping.be", Subject: "Re: SIMM configuration on PCI MB. HELP!", Web Newgroup, comp.sys.ibm.pc.hardware.chips, posted on Jun. 16, 1995, obtained via www.google.com,(1995),1 p.
Zabar, *Google Search of "edo triton fpm"*, From: "Me@here.there", Subject: "Re: A Technically Knowledgeable Sales Rep?", Web Newsgroup, alt.sys.pc-clone.gateway2000, posted on Mar. 29, 1995, obtained via www.google.com.,(1995),2 p.
"Chips: Intel Corp. intros higher performing PCI chip set for Pentium processors; Triton architecture unlocks Pentium processor power necessary for multitude of applications (Intel Corp.'s 82430FX)", *EDGE: Work-Group Computing Report*, vol. 6, No. 246, (1995),10(1).
"Intel Readies Triton PCI chipset (Intel's 82430FX)", *Electronic News*, vol. 41, No. 2050, (1995),68(1).
Gowni, Shiva P., et al., "A 9NS, 32K×9, BiCMOS TTL Synchronous Cache RAM with Burst ;Mode Access", *IEEE 1992 Custom Integrated Circuits Conference*, Boston USA, (May 1992),7.8.1-7.8.4.
INTEL, "Intel Electronic News", *ISSN: 1061-6624, Electronic News Publishing Corp.*, (Dec. 5, 1994),26.
Intel Corporation, "82430FX PCIset Datasheet 82437FX System Controller (TSC) and 82438FX Data Path Unit (TDP)", *Intel Corporation*, Order No. 290518-002,(Nov. 1996),1-67.
Jenisch, E. , et al., "P55TP4 (Triton-based)-Sync/Burst SRAMS?", www.google.com, (1995),7 pages.
Micron, "DRAM 1 Meg×4 DRAM 5VEDO Page Mode", *Micron Technology, Inc. DRAM Data Book*, (1995),1-1 thru 1-30.
Micron Semiconductor Inc., ""Synchronous DRAM 2 MEG×8 SDRAM"", (Rev. Apr. 1994)),2-43 through 2083.
Mosel-Vitelic, "Mosel-Vitelic V53C8257H DRAM Specification Sheet", (Jul. 2, 1994),20 pgs.
Samberg Electronics, "Samsung Synchronous DRAM", (Mar. 1993), 1-16.
Simcheck, "Old SIMCHECK Product Line", *Product Information*, obtained from http://www.simcheck.com, (1995),1-3.
Sullivan, K. , "Slimcheck Add-on Lets Users Identify Faulty DRAM Chips", *PC Week, 7(18)*, (Obtained from Computer Select, Document No. 46161),(May 1990),18.
Tatosian, D. , "Detecting EDO RAM with Triton Mainboards", http://www.deganews.com,(1995),2 pgs.
Toshiba, "4M DRAM 1991", *Toshiba America Electronic Components, Inc.*, (1991),A-137-A-159.
Toshiba, "Pipelined Burst DRAM", *Toshiba, JEDEC JC 42.3 Hawaii*, (Dec. 1994),9 pgs.

| Burst Length | Starting Column Address | | | Linear | Interleave |
|---|---|---|---|---|---|
| | $A_2$ | $A_1$ | $A_0$ | | |
| 2 | V | V | 0 | 0-1 | 0-1 |
| | V | V | 1 | 1-0 | 1-0 |
| 4 | V | 0 | 0 | 0-1-2-3 | 0-1-2-3 |
| | V | 0 | 1 | 1-2-3-0 | 1-0-3-2 |
| | V | 1 | 0 | 2-3-0-1 | 2-3-0-1 |
| | V | 1 | 1 | 3-0-1-2 | 3-2-1-0 |
| 8 | 0 | 0 | 0 | 0-1-2-3-4-5-6-7 | 0-1-2-3-4-5-6-7 |
| | 0 | 0 | 1 | 1-2-3-4-5-6-7-0 | 1-0-3-2-5-4-7-6 |
| | 0 | 1 | 0 | 2-3-4-5-6-7-0-1 | 2-3-0-1-6-7-4-5 |
| | 0 | 1 | 1 | 3-4-5-6-7-0-1-2 | 3-2-1-0-7-6-5-4 |
| | 1 | 0 | 0 | 4-5-6-7-0-1-2-3 | 4-5-6-7-0-1-2-3 |
| | 1 | 0 | 1 | 5-6-7-0-1-2-3-4 | 5-4-7-6-1-0-3-2 |
| | 1 | 1 | 0 | 6-7-0-1-2-3-4-5 | 6-7-4-5-2-3-0-1 |
| | 1 | 1 | 1 | 7-0-1-2-3-4-5-6 | 7-6-5-4-3-2-1-0 |

FIG. 2

CONTINUOUS INTERLEAVE BURST ACCESS

CROSS-REFERENCE TO RELATED APPLICATION(S)

This application is a continuation of U.S. patent application Ser. No. 10/118,299, filed on Apr. 8, 2002 now U.S. Pat. No. 6,601,156, which is a continuation of U.S. patent application Ser. No. 08/675,139, filed on Jul. 3, 1996, now U.S. Pat. No. 6,401,186 issued on Jun. 4, 2002, which are hereby incorporated by reference.

TECHNICAL FIELD OF THE INVENTION

The present invention relates generally to memory devices and in particular the present invention relates to burst access memory devices.

BACKGROUND OF THE INVENTION

There is a demand for faster, higher density, random access memory integrated circuits which provide a strategy for integration into today's personal computer systems. In an effort to meet this demand, numerous alternatives to the standard DRAM architecture have been proposed. One method of providing a longer period of time when data is valid at the outputs of a DRAM without increasing the fast page mode cycle time is called Extended Data Out (EDO) mode. In an EDO DRAM the data lines are not tri-stated between read cycles. Instead, data is held valid after CAS* goes high until sometime after the next CAS* low pulse occurs, or until RAS* or the output enable (OE*) goes high. Determining when valid data will arrive at the outputs of a fast page mode or EDO DRAM can be a complex function of when the column address inputs are valid, when CAS* falls, the state of OE* and when CAS* rose in the previous cycle. The period during which data is valid with respect to the control line signals (especially CAS*) is determined by the specific implementation of the EDO mode, as adopted by the various DRAM manufacturers.

Yet another type of memory device is a burst EDO memory which adds the ability to address one column of a memory array and then automatically address additional columns in a pre-determined manner without providing the additional column addresses on external address lines. These memory devices use a column access input to access the memory array columns.

A latency is experienced during a read operation. That is, output data is not immediately available following an externally applied column address. The latency is required to prepare, access and sense data stored at the new address.

Regardless of the type of memory, a processor receiving data from a memory may delay a new memory read operation until a prior read is complete. This delay results in a delay of new valid data. For the reasons stated above, and for other reasons stated below which will become apparent to those skilled in the art upon reading and understanding the present specification, there is a need in the art for a memory system which anticipates the address of a new memory read operation to reduce or eliminate delays in valid data.

SUMMARY OF THE INVENTION

The above mentioned problems with accessing data stored in a memory device and other problems are addressed by the present invention and which will be understood by reading and studying the following specification. A system is described which anticipates the memory address to be used in future data read operations as requested by a microprocessor.

In particular, the present invention describes a system comprising a synchronous memory device having addressable memory cells, a microprocessor coupled to the synchronous memory device for data communication with the addressable memory cells, the microprocessor further initiating a data read operation at a first memory cell address. A memory controller is connected to the microprocessor and the synchronous memory device. The memory controller produces a second memory cell address and initiates a read operation in anticipation of a second data read operation at a new memory cell address provided from the microprocessor.

Alternatively, a system is described which comprises a microprocessor, a burst access memory having addressable memory cells for providing data in response to a read request from the microprocessor, the read request including a start memory cell address, and address generation circuitry included in the burst access memory for generating a memory cell address and initiating a read operation in anticipation of a read request from the microprocessor.

In still another embodiment, a method of continuously outputting data from a synchronous memory device is described. The method comprises the steps of providing a read request from a microprocessor, the read request including a memory cell start address for the synchronous memory device. The method further including the steps of initiating a read operation using a memory controller in response to the read request, and outputting data from the synchronous memory device in response to the memory controller. A new memory address is generated in anticipation of a second read request from the microprocessor, the second read request including a second memory cell start address. Finally, a second read operation is initiated and data is output from the synchronous memory device starting at the new memory address.

BRIEF DESCRIPTION OF THE DRAWINGS

FIG. 2 is a table which shows linear and interleaved addressing sequences;

DETAILED DESCRIPTION OF THE INVENTION

In the following detailed description of the preferred embodiments, reference is made to the accompanying drawings which form a part hereof, and in which is shown by way of illustration specific preferred embodiments in which the inventions may be practiced. These embodiments are described in sufficient detail to enable those skilled in the art to practice the invention, and it is to be understood that other embodiments may be utilized and that logical, mechanical and electrical changes may be made without departing from the spirit and scope of the present inventions. The following detailed description is, therefore, not to be taken in a limiting sense, and the scope of the present inventions is defined only by the appended claims.

Figure 1:
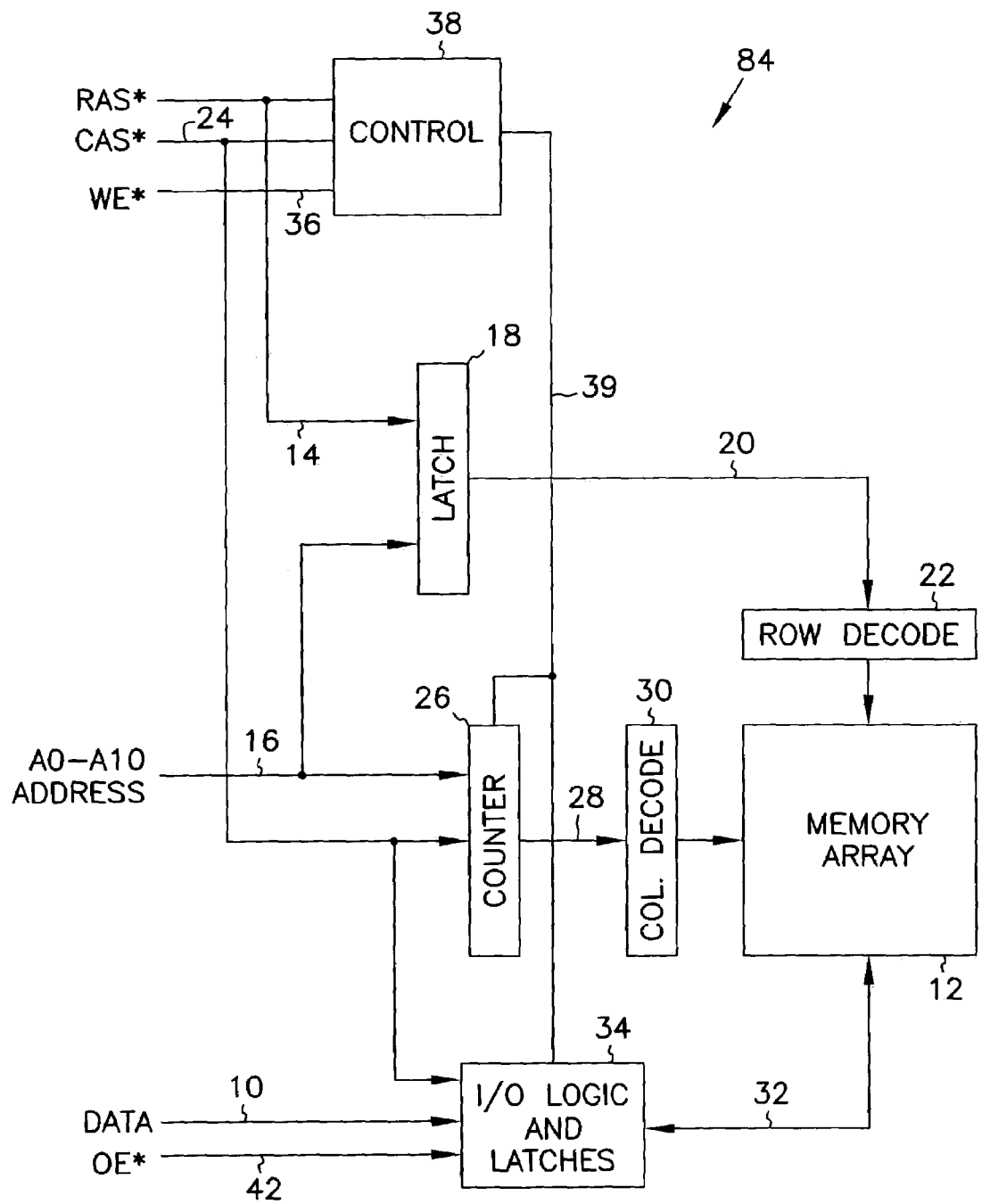
FIG. 1 is a burst access memory device.

FIG. 1 is a schematic representation of a sixteen megabit device 84 designed to operate in a burst access mode. The device is organized as a 2 Meg×8 burst EDO DRAM having an eight bit data input/output path 10 providing data storage for 2,097,152 bytes of information in the memory array 12. An active-low row address strobe (RAS*) signal 14 is used to latch a first portion of a multiplexed memory address, from address inputs AO through A10 16, in latch 18. The latched row address 20 is decoded in row decoder 22. The decoded row address is used to select a row of the memory array 12. An active-low column address strobe (CAS*) signal 24 is used to latch a second portion of a memory address from address inputs 16 into column address counter 26. The latched column address 28 is decoded in column address decoder 30. The decoded column address is used to select a column of the memory array 12.

In a burst read cycle, data within the memory array located at the row and column address selected by the row and column address decoders is read out of the memory array and sent along data path 32 to output latches 34. Data 10 driven from the burst EDO DRAM may be latched external to the device in synchronization with a clock signal after a predetermined number of clock cycle delays (latency). For a two cycle latency design, the first CAS* falling edge is used to latch the initial address for the burst access. The first burst data from the memory is driven from the memory after the second CAS* falling edge, and remains valid through the third CAS* falling edge. Once the memory device begins to output data in a burst read cycle, the output drivers 34 will continue to drive the data lines without tri-stating the data outputs during CAS* high intervals dependent on the state of the output enable and write enable (OE* and WE*) control lines, thus allowing additional time for the system to latch the output data. Once a row and a column address are selected, additional transitions of the CAS* signal are used to advance the column address within the column address counter in a predetermined sequence. The time at which data will be valid at the outputs of the burst EDO DRAM is dependent only on the timing of the CAS* signal provided that OE* is maintained low, and WE* remains high.

The address may be advanced linearly, or in an interleaved fashion for maximum compatibility with the overall system requirements. FIG. 2 is a table which shows linear and interleaved addressing sequences for burst lengths of 2, 4 and 8 cycles. The "V" for starting addresses A1 and A2 in the table represent address values that remain unaltered through the burst sequence. The column address may be advanced with each CAS* transition, or each pulse. When the address is advanced with each transition of the CAS* signal, data is also driven from the part after each transition following the device latency which is then referenced to each edge of the CAS* signal. This allows for a burst access cycle where the CAS* toggles only once (high to low or low to high) for each memory cycle.

In the burst access memory device, each new column address from the column address counter is decoded and is used to access additional data within the memory array without the requirement of additional column addresses being specified on the address inputs 16. This burst sequence of data will continue for each CAS* falling edge until a predetermined number of data accesses equal to the burst length has occurred. A CAS* falling edge received after the last burst address has been generated will latch another column address from the address inputs 16 if CAS* is low and a new burst sequence will begin. Read data is latched and output with each falling edge of CAS* after the first CAS* latency. For a burst write cycle, data 10 is latched in input data latches 34. Data targeted at the first address specified by the row and column addresses is latched with the CAS* signal when the first column address is latched (write cycle data latency is zero). Other write cycle data latency values are possible; however, for today's memory systems, zero is preferred. Additional input data words for storage at incremented column address locations are latched by CAS* on successive CAS* pulses. Input data from the input latches 34 is passed along data path 32 to the memory array where it is stored at the location selected by the row and column address decoders. As in the burst read cycle previously described, a predetermined number of burst access writes will occur without the requirement of additional column addresses being provided on the address lines 16. After the predetermined number of burst writes has occurred, a subsequent CAS* will latch a new beginning column address, and another burst read or write access will begin.

The write enable signal is used in burst access cycles to select read or write burst accesses when the initial column address for a burst cycle is latched by CAS*. WE* low at the column address latch time selects a burst write access. WE* high at the column address latch time selects a burst read access. A low to high transition within a burst write access will terminate the burst access, preventing further writes from occurring. A high to low transition on WE* within a burst read access will likewise terminate the burst read access and will place the data output 10 in a high impedance state. Transitions of the WE* signal may be locked out during critical timing periods within an access cycle in order to reduce the possibility of triggering a false write cycle. After the critical timing period, the state of WE* will determine whether a burst access continues, is initiated, or is terminated. Termination of a burst access resets the burst length counter and places the DRAM in a state to receive another burst access command. Both RAS* and CAS* going high during a burst access will also terminate the burst access cycle placing the data drivers in a high impedance output state, and resetting the burst length counter. The burst length counter is preferably included in the control logic circuit 38. The burst length counter is used to keep track of how many cycles are performed in a burst access, and is not the same as the address counter which generates the burst addresses for the memory array.

A minimum write enable pulse width is only required when it is desired to terminate a burst read and then begin another burst read, or terminate a burst write prior to performing another burst write with a minimum delay between burst accesses. In the case of burst reads, WE* will transition from high to low to terminate a first burst read, and then WE* will transition back high prior to the next falling edge of CAS* in order to specify a new burst read cycle. For burst writes, WE* would transition high to terminate a current burst write access, then back low prior to the next falling edge of CAS* to initiate another burst write access.

A basic implementation of the device of FIG. 1 may include a fixed burst length of 4, a fixed CAS* latency of 2 and a fixed interleaved sequence of burst addresses.

The burst access memory has been described with reference to several embodiments. Just as fast page mode DRAMs and EDO DRAMs are available in numerous configurations including x1, x4, x8 and x16 data widths, and 1 Megabit, 4 Megabit, 16 Megabit and 64 Megabit densities; the burst access memory device may take the form of many different memory organizations.

Figure 3:
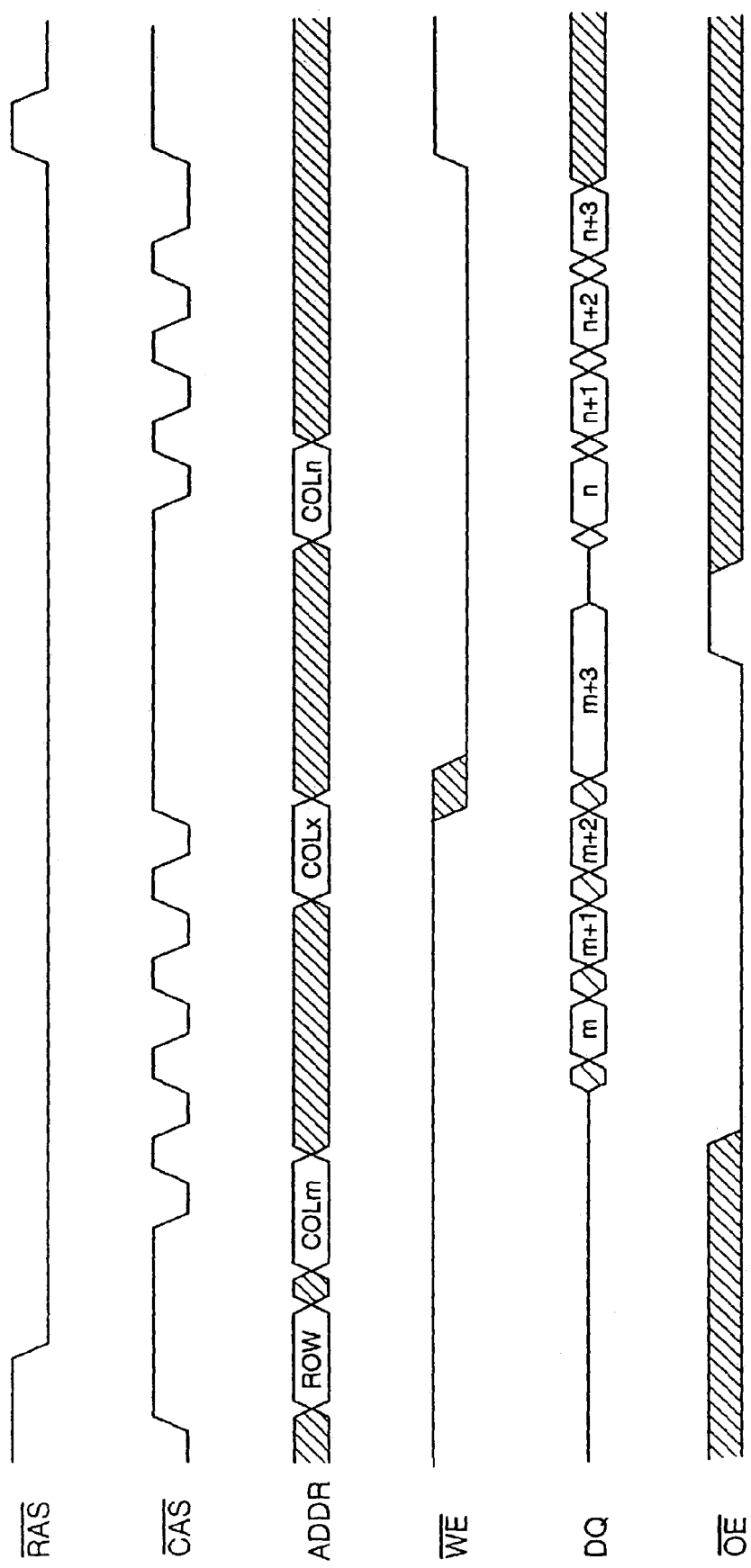
FIG. 3 is a timing diagram for performing a burst read followed by a burst write of the device of FIG. 1.

FIG. 3 is a timing diagram for performing a burst read followed by a burst write of the device of FIG. 1. In FIG. 3, a row address is latched by the RAS* signal. WE* would be low when RAS* falls for an embodiment of the design where the state of the WE* pin is used to specify a burst access cycle at RAS* time. Next, CAS* is driven low with WE* high to initiate a burst read access, and the column address is latched. The data out signals (DQ's) are not driven in the first CAS* cycle. On the second falling edge of the CAS* signal, the internal address generation circuitry advances the column address and begins another access of the array, and the first data out is driven from the device after a CAS* to data access time (tCAC). Additional burst access cycles continue, for a device with a specified burst length of four, until the fifth falling edge of CAS* which latches a new column address for a new burst read access. WE* falling in the fifth CAS*-cycle terminates the burst access, and initializes the device for additional burst accesses. The sixth falling edge of CAS* with WE* low is used to latch a new burst address, latch input data and begin a burst write access of the device. Additional data values are latched on successive CAS* falling edges until RAS* rises to terminate the burst access.

Figure 4:
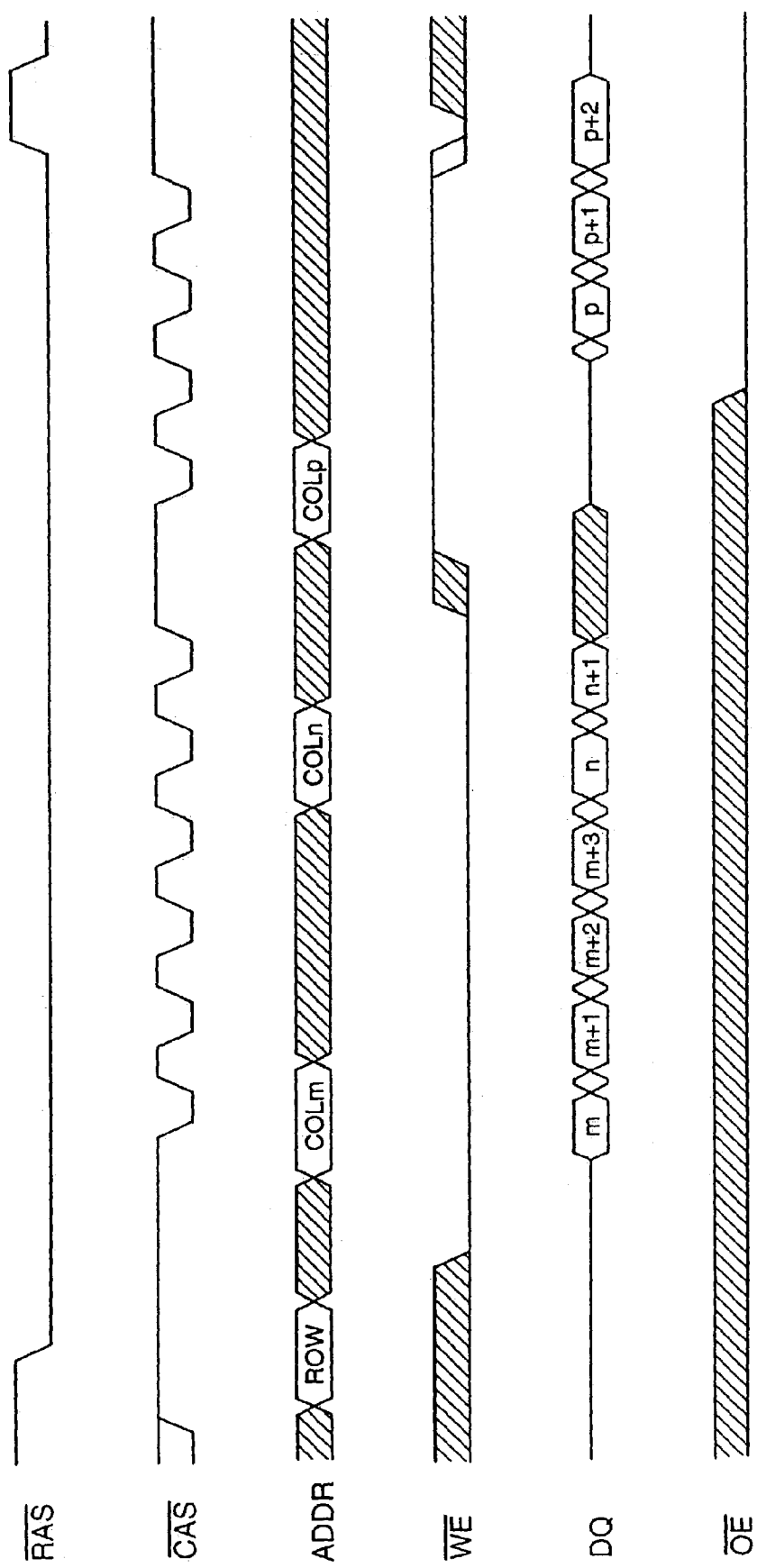
FIG. 4 is a timing diagram depicting burst write access cycles followed by burst read cycles of the device of FIG. 1.

FIG. 4 is a timing diagram depicting burst write access cycles followed by burst read cycles. As in FIG. 3, the RAS* signal is used to latch the row address. The first CAS* falling edge in combination with WE* low begins a burst write access with the first data being latched. Additional data values are latched with successive CAS* falling edges, and the memory address is advanced internal to the device in either an interleaved or sequential manner. On the fifth CAS* falling edge a new column address and associated write data are latched. The burst write access cycles continue until the WE* signal goes high in the sixth-CAS* cycle. The transition of the WE* signal terminates the burst write access. The seventh CAS* low transition latches a new column address and begins a burst read access (WE* is high). The burst read continues until RAS* rises terminating the burst cycles.

Continuous Burst Access

Figure 5:
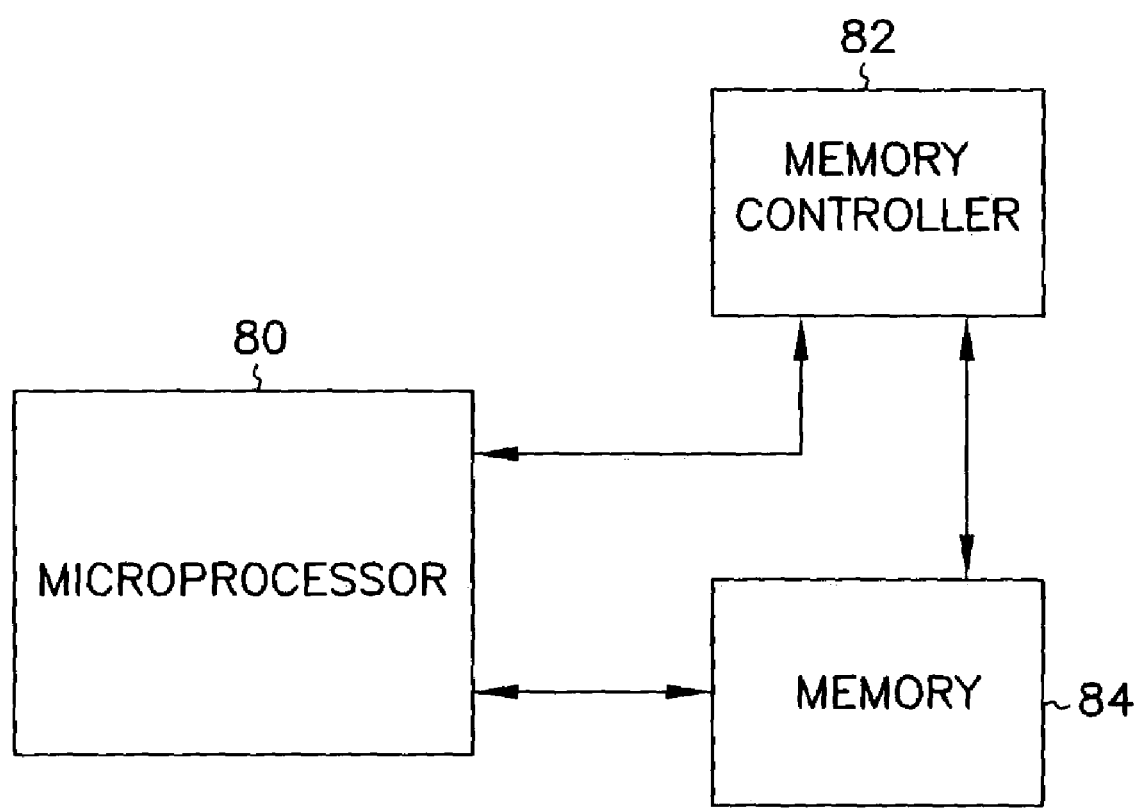
FIG. 5 illustrates a typical system of the present invention.

FIG. 5 illustrates a typical system application of the burst access memory described above. A microprocessor 80 and memory controller 82 are connected to the memory device 84. Memory device 84 may be any type of module, for example a single in-line memory module (SIMM), dual in-line memory module (DIMM), or a multi-chip module (MCM). The microprocessor communicates data with the memory device and provides instructions to the memory controller. It will be appreciated by those skilled in the art that a system using a burst memory may have to wait up to four CAS* cycles to read additional data from the memory. This delay is due to both latency and buffering. For example, in a four word burst access, two to four extra CAS* pulses may be required from the memory controller to communicate the last burst data to the microprocessor.

Figure 6:
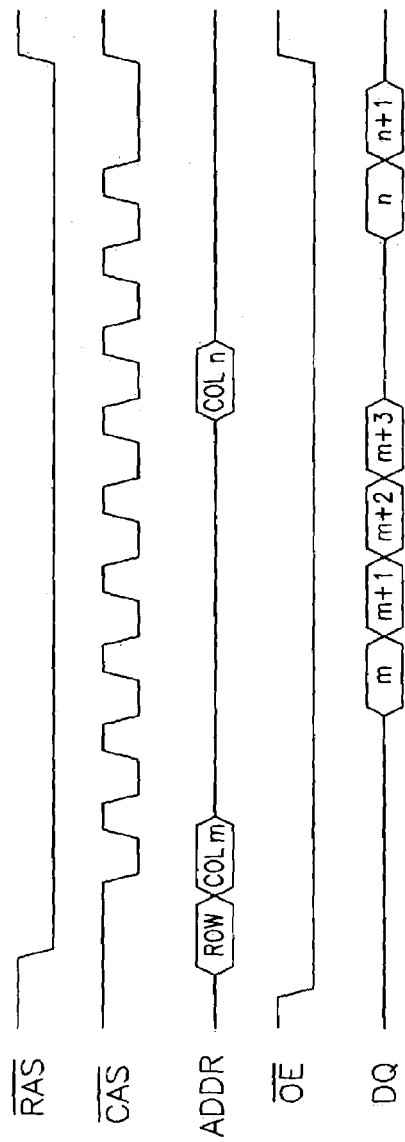
FIG. 6 is a timing diagram of successive read operations of a burst access memory.

If the data from a memory burst read is needed by the microprocessor to determine a new memory address, unnecessary delay may be experienced. That is, the time needed to initiate a new read operation after the termination of a prior read is avoidable delay. For comparison, FIG. 6 illustrates successive read operations of a burst access memory where the second read operation is not initiated until after the first read operation is complete. The burst access illustrated has a latency of three CAS* cycles. The data, therefore, is output from the memory starting on the third CAS* falling edge. A three cycle delay in output data is incurred following the end of the COLm data sequence and the beginning of the COLn data sequence.

The present invention includes memory controller 82 which initiates a read operation at a memory address determined to be the most likely next address to be requested by the microprocessor 80. The memory controller, therefore, anticipates the next address to be requested by the microprocessor. If the microprocessor requests data from the memory which corresponds to the new address determined by the memory controller, access time is saved. If the new memory address requested by the microprocessor is different from that determined by the memory controller, no additional access time is incurred by the system than would be required from a system not incorporating the present invention. The memory controller can include an address comparator which compares an address requested by the microprocessor and a new address generated by the memory controller. If the addresses are the same, the memory controller continues with the new burst read operation. If the address requested by the microprocessor is different from that produced by the memory controller, a new read operation is initiated at the address provided by the microprocessor. Alternatively, the microprocessor can be programmed such that the next address generated by the memory controller is known. This embodiment allows the microprocessor to use the new data without requesting a read operation. The burst memory 84 can include an address generation circuit which determines the next address to be requested by the microprocessor. The memory controller, therefore, does not determine the next address.

Continuous Read Operation

Figure 7:
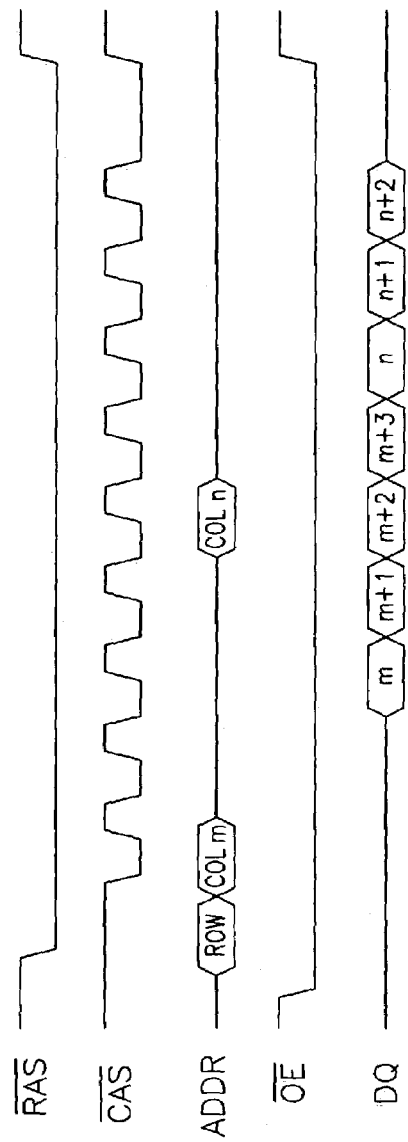
FIG. 7 is a timing diagram of successive read operations of the system of FIG. 5.

FIG. 7 is a timing diagram of a portion of a continuous burst read operation in accordance with a preferred embodiment of the present invention. A first column address (COLm) identified by the microprocessor 80 is provided to the memory 84. The first address is used as the starting address for the burst read operation. The internal address is advanced in either a sequential or interleaved manner as described above with reference to FIG. 2. The burst access illustrated has a latency of three CAS* cycles. The data is burst read from the memory starting on the third CAS* falling edge. A new column address (COLn) is provided on the address lines by the memory controller 82 on the fifth CAS* cycle. A data sequence originating at the new column address is burst out starting on the seventh CAS*, incurring no data output delay. The microprocessor 80 can request data from the memory controller between the fifth and eighth CAS* cycle without incurring a delay. If the microprocessor requests data from an address different than the address generated by the memory controller, data provided on the DQ lines is ignored by the microprocessor until the microprocessor's new address is accessed. A latency delay will be experienced similar to that shown in FIG. 6.

It will be appreciated by those skilled in the art, that the present invention can include an address generator internal to the memory control circuitry 38 which produces a new column address if a valid new address is not provided on the external address lines. To assist the memory controller, the output enable (OE*) input can be used to indicate the presence of a valid address on the address lines. Further, additional counter circuitry can be added to the memory to enable the memory to output a full length column sequence.

The column address generated in the absence of a request by the microprocessor can be determined in any number of ways. The new address can be produced by repeating the prior sequence with an advanced most significant bit, as shown in Tables 1 where X represents address most significant bits (MSB's) followed by bits A1 and A0. In Table 1 an interleaved address sequence is shown for a burst length of 4. The next burst sequence start address is derived by incrementing the MSB's (X) and by repeating the initial LSB's (A1, A0). In Table 2 the next burst sequence start address is derived by incrementing the MSB's and resetting the LSB's to 0, 0. Either of these methods may be utilized for other burst length options, and for other addressing sequences.

TABLE 1

| START ADDRESS | NEXT ADDRESS |
| --- | --- |
| X01 | (X + 1) 01 |
| X00 | (X + 1) 00 |
| X11 | (X + 1) 11 |
| X10 | (X + 1) 10 |

TABLE 2

| START ADDRESS | NEXT ADDRESS |
| --- | --- |
| X01 | (X + 1) 00 |
| X00 | (X + 1) 01 |
| X11 | (X + 1) 10 |
| X10 | (X + 1) 11 |

An alternate method of bursting data in the absence of a request by the microprocessor is a full page burst access. That is, the memory outputs data from the full memory page starting at the address next column address.

Figure 8:
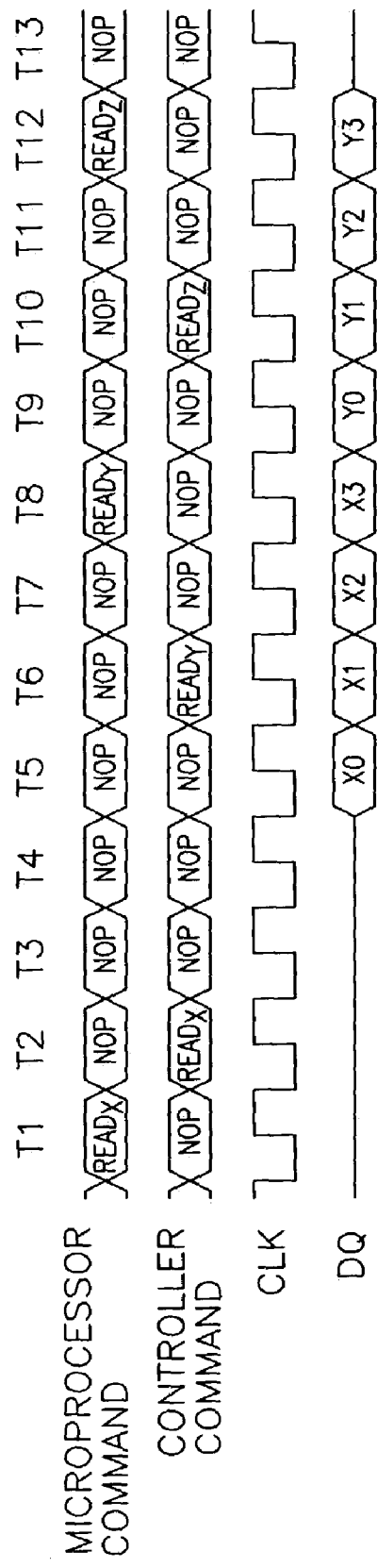
FIG. 8 is a timing diagram of an operation of an SDRAM used in the system of FIG. 5.

FIG. 8 illustrates one operation of the system of an SDRAM which can be used in the system of FIG. 5. For a detailed description of a SDRAM see 1995 DATA SHEET 16M DRAM, provided by Samsung Electronics and incorporated herein by reference. At time t1, the microprocessor 80 issues a read command for column X. At time t2 controller 82 issues a read command to the memory 84 for column X. The memory in this illustration has a latency of 3 and burst length of 4. Data from column X is valid from time t5 to t8. At time t6, the memory controller issues an anticipatory read command for column address Y. At time t8 the microprocessor issues a read command for column address Y. Valid data from column Y is provided from time t9 to t12.

Figure 9:
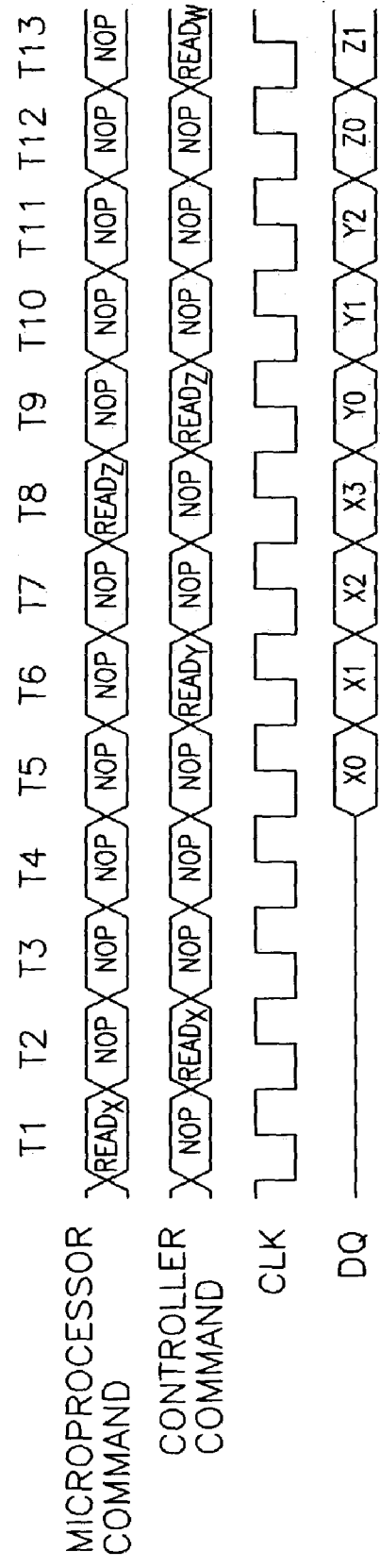
FIG. 9 is a timing diagram of another operation of the SDRAM of FIG. 8.

Referring to FIG. 9, at time t1, the microprocessor 80 issues a read command for column X. At time t2 controller 82 issues a read command to the memory 84 for column X. The memory in this illustration has a latency of 3 and burst length of 4. Data from column X is valid from time t5 to t8. At time t6, the memory controller issues an anticipatory read command for column address Y. At time t8 the microprocessor issues a read command for column address Z. Valid data from column Y is provided from time t9 to t11. Valid data from column Z is provided starting at time t12.

It will be appreciated that in the operation of FIG. 8 three clock cycles are saved by correct anticipation of the next read address. In the operation illustrated in FIG. 9, the data from column Y is ignored while the microprocessor waits for data from column Z.

CONCLUSION

A system has been described which uses a burst access memory and a memory controller to anticipate the memory address to be used in future data read operations as requested by a microprocessor. Either the memory controller or the memory device initiates a burst read operation starting at a memory address generated thereby. The microprocessor can, therefore, wait to initiate a data read without suffering a time delay. The new address is generated in a predetermined pattern. The memory controller can include a comparator to compare an address provided by the microprocessor with the predetermined address. The memory controller can thereby ignore a read request from the microprocessor which corresponds to the generated address. Alternately, the microprocessor can withhold a request if the correct address has been initiated by the memory controller.

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. For example, synchronous DRAMs can be used in place of the burst access memory device without departing from the present invention. Therefore, it is manifestly intended that this invention be limited only by the claims and the equivalents thereof.

What is claimed is:

1. A memory controller, comprising:
   means to detect a first start address for a first burst output from a memory cell array; and
   means to generate an anticipated start address for an anticipated burst output, wherein the anticipated start address is based on the first start address and is in anticipation of a second start address such that, when the anticipated start address corresponds to the second start address, the anticipated burst output follows the first burst output and maintains an active data output stream from the memory cell array for the first burst output associated with the first start address and a second burst output associated with the second start address.

2. The memory controller of claim 1, wherein the means to provide an anticipated start address includes means to advance one or more most significant bits (MSB's) of the first start address to provide the anticipated start address.

3. The memory controller of claim 1, further comprising means to compare the second start address to the anticipated start address to determine whether the anticipated burst output corresponds to the second burst output.

4. A memory controller, comprising:
   means to provide a first burst output from a memory cell array in response to a first start address from a microprocessor;
   means to provide an anticipated start address in anticipation of a second start address from the microprocessor; and
   means to initiate an anticipated burst output from the memory cell array in response to the anticipated start address, wherein the anticipated burst output follows the first burst output and maintains an active data output stream from the memory cell array for the first start address and the second start address.

5. The memory controller of claim 4, further comprising means to compare the anticipated start address to the second start address from the microprocessor to determine whether the anticipated burst output corresponds to a desired second burst output from the memory cell array that corresponds to the second start address from the microprocessor.

6. The memory controller of claim 4, wherein the means to provide an anticipated start address includes means to advance one or more most significant bits (MSB's) of the first start address to provide the anticipated start address.

7. The memory controller of claim 4, further comprising means to generate a linear sequence of addresses for the first burst output and the anticipated burst output.

8. The memory controller of claim 4, further comprising means to generate an interleaved sequence of addresses for the first burst output and the anticipated burst output.

9. A system, comprising:
a burst access memory, the burst access memory to provide a first burst read output in response to a first memory address; and
an address generator to initiate an anticipated burst read output from the burst access memory beginning with an anticipated memory address;
wherein, when the anticipated memory address corresponds to a second start address and the anticipated burst read output corresponds to a second burst read output beginning with the second start address, the second burst read output follows the first burst read output and maintains an active data output stream from the burst access memory for the first start address and the second start address.

10. The system of claim 9, further comprising a memory controller to communicate with the burst access memory, the memory controller including the address generator.

11. The system of claim 10, wherein the memory controller further includes a comparator to compare the anticipated start address to the second start address.

12. The system of claim 9, wherein the burst access memory includes the address generator.

13. The system of claim 9, further comprising a comparator to compare the anticipated start address to the second start address.

14. A system, comprising:
a burst access memory;
a processor to request a first read operation followed by a second read operation, the processor to provide a first start address to the burst access memory for the first read operation and to provide a second start address to the burst access memory for the second read operation;
an address generator to detect the first start address and provide an anticipated start address to the burst access memory in response to the first start address;
the burst access memory to output a first burst output in response to the first start address and to output an anticipated burst output in response to the anticipated start address,
wherein, when the anticipated start address corresponds to the second start address, the anticipated burst output follows the first burst output and maintains an active data output stream from the burst access memory from the first read operation to the second read operation.

15. The system of claim 14, wherein the address generator is adapted to advance one or more most significant bits (MSB's) of the first start address to provide the anticipated start address.

16. The system of claim 14, wherein the burst access memory includes the address generator.

17. The system of claim 14, further comprising a memory controller to communicate with the burst access memory, the memory controller including the address generator.

18. A system, comprising:
addressable memory cells;
a processor to generate a first start address to read the memory cells; and
a memory controller to receive the first start address, to output a first data series from the addressable memory cells to the processor in response to receiving the first start address, to generate an anticipated start address in response to receiving the first start address, and to output an anticipated data series from the addressable memory cells such that the anticipated data series follows the first data series to maintain an active data output stream from the addressable memory cells to the processor.

19. The system of claim 18, wherein the memory controller to advance one or more most significant bits (MSB's) of the first start address to provide the anticipated start address.

20. The system of claim 18, wherein the memory controller is adapted to generate a linear sequence of addresses for the first data series and the anticipated data series.

21. The system of claim 18, wherein the memory controller is adapted to generate an interleaved sequence of addresses for the first data series and the anticipated data series.

22. The system of claim 18, wherein the processor is adapted to generate a second start address and the memory controller is adapted to compare the second start address to the anticipated start address.

23. The system of claim 18, wherein the memory controller is adapted to provide the anticipated start address to the processor for comparison to a second start address.

24. A system, comprising:
a memory device, including addressable memory cells and control circuitry to provide burst outputs from the addressable memory cells in response to an address;
a processor to request a first burst read operation from the addressable memory cells followed by a second burst read operation from the addressable memory cells, the processor to provide a first address to the control circuitry of the memory device for the first burst read operation and to provide a second address to the control circuitry of the memory device for the second burst read operation, the memory device to output a first burst output in response to the first address; and
an address generator to provide an anticipated address to the memory device based on the first address such that the memory device outputs an anticipated burst output, wherein when the anticipated address corresponds to the second address, the memory device maintains an active data stream for the first burst read operation and the second burst read operation.

25. The system of claim 24, further comprising a memory controller to communicate with the memory device, the memory controller including the address generator.

26. The system of claim 24, wherein the memory device includes an address generator.

27. The system of claim 24, wherein the address generator is adapted to advance one or more most significant bits (MSB's) of the first start address to provide the anticipated start address.

28. A method for outputting data from a burst access memory, comprising:
   receiving a first read request, including receiving a first start address;
   in response to receiving the first start address,
      outputting a first data series from the burst access memory beginning with the first start address, and
      outputting an anticipated data series from the burst access memory beginning with an anticipated start address such that the anticipated data series follows the first data series and maintains an active data stream from the burst access memory;
   comparing a second start address to the anticipated start address;
   interrupting the anticipated data series and outputting a second data series from the burst access memory that corresponds to the second start address when the second start address does not correspond to the anticipated start address, and outputting the anticipated data series as the second data series when the second start address corresponds to the anticipated start address.

29. The method of claim 28, wherein both outputting a first data series and outputting an anticipated data series includes outputting a full column data sequence.

30. The method of claim 28, further comprising generating the anticipated start address using an interleaved sequence.

31. The method of claim 28, further comprising generating the anticipated start address using a linear sequence.

32. The method of claim 28, further comprising receiving the second start address, and ignoring the received second start address when the anticipated start address corresponds to the received second start address.

33. The method of claim 28, further comprising sending the anticipated start address to a processor that is sending the first and second start address such that the processor withholds sending the second start address when the second start address corresponds to the anticipated start address.

34. A method for outputting data from a burst access memory, comprising:
   receiving a first read request, including receiving a first start address;
   in response to receiving the first start address,
      outputting a first data series from the burst access memory beginning with the first start address, and
      outputting an anticipated data series from the burst access memory beginning with an anticipated start address such that the anticipated data series follows the first data series and maintains an active data stream from the burst access memory;
   comparing a second start address to the anticipated start address;
   interrupting the anticipated data series if the second start address is not received before the burst access memory is ready to output a second data series, the second data series corresponding to the second start address and further corresponding to the anticipated data series when the second start address corresponds to the anticipated start address.

35. A method for outputting data from a burst access memory, comprising:
   receiving a first read request, including receiving a first start address;
   in response to receiving the first start address,
      outputting a first data series from the burst access memory beginning with the first start address, and
      outputting an anticipated data series from the burst access memory beginning with an anticipated start address such that the anticipated data series follows the first data series and maintains an active data stream from the burst access memory;
   comparing a second start address to the anticipated start address;
   interrupting the anticipated data series if the second start address is not received before a second data series is ready to be presented to a processor, the second data series corresponding to the second start address and further corresponding to the anticipated data series when the second start address corresponds to the anticipated start address.

36. A method for performing burst read operations, comprising:
   receiving a first address for a first burst read operation;
   in response to receiving the first address, providing a first burst output from a memory array corresponding to the first burst read operation, generating an anticipated address, and providing an anticipated burst output from the memory array following the first burst output, wherein an active data stream is maintained between the first burst output and the anticipated burst output;
   comparing a second address corresponding to a second burst read operation to the anticipated address, and when the second address corresponds to the anticipated address, continuing the anticipated burst output as a second burst output from the memory array corresponding to the second burst read operation, wherein an active data stream is maintained from the first and second burst read operations.

37. The method of claim 36, wherein comparing a second address corresponding to a second burst read operation to the anticipated address includes using a comparator in a memory controller to compare the second address to the anticipated address, and ignoring the second address when the second address corresponds to the anticipated address.

38. The method of claim 36, wherein comparing a second address corresponding to a second burst read operation to the anticipated address includes communicating the anticipated start address to a processor that sends the first address and the second burst read operation by sending the second address, the processor to withhold the second address when the second address corresponds to the anticipated address.

* * * * *

UNITED STATES PATENT AND TRADEMARK OFFICE
CERTIFICATE OF CORRECTION

PATENT NO. : 6,981,126 B1
APPLICATION NO. : 10/615003
DATED : December 27, 2005
INVENTOR(S) : Blodgett It is certified that error appears in the above-identified patent and that said Letters Patent is hereby corrected as shown below:

On the title page:

On page 3, in item (56), under "Other Publications" in column 1, line 3, delete "Dram Schematicism," and insert - - DRAM Schematics, - -, therefor.

On page 3, in item (56), under "Other Publications", in column 1, line 19, delete "Dram" and insert - - DRAM - -, therefor.

On page 3, in item (56), under "Other Publications", in column 1, line 54, delete "Googie" and insert - - Google - -, therefor.

On page 3, in item (56), under "Other Publications", in column 1, line 64, delete "Coporation," and insert - - Corporation, - -, therefor.

On page 3, in item (56), under "Other Publications", in column 2, line 8, delete "Satae" and insert - - State - -, therefor.

On page 3, in item (56), under "Other Publications", in column 2, line 17, delete "Newgroup," and insert - - Newsgroup, - -, therefor.

On page 3, in item (56), under "Other Publications", in column 2, line 24, delete "com.," and insert - - com, - -, therefor.

On page 3, in item (56), under "Other Publications", in column 2, line 48, after "1994" delete "))" and insert - - ) - -, therefor.

UNITED STATES PATENT AND TRADEMARK OFFICE
CERTIFICATE OF CORRECTION

PATENT NO.        : 6,981,126 B1
APPLICATION NO. : 10/615003
DATED             : December 27, 2005
INVENTOR(S)       : Blodgett It is certified that error appears in the above-identified patent and that said Letters Patent is hereby corrected as shown below:

On page 3, in item (56), under "Other Publications", in column 2, line 48, delete "2083." and insert - - 2-83. - -, therefor.

On page 3, in item (56), under "Other Publications", in column 2, line 51, delete "Samberg" and insert - - Samsung - -, therefor.

In column 5, line 24, delete "-cycle" and insert - - cycle - -, therefor.

In column 10, line 20-21, in Claim 19, after "controller" insert - - is adapted - -.

Signed and Sealed this

Fifteenth Day of August, 2006

JON W. DUDAS
*Director of the United States Patent and Trademark Office*